United States Patent

[11] 3,614,371

| [72] | Inventors | Robert L. Simpkins<br>Pontiac;<br>Joseph R. Karr, Dearborn Heights; Jerry W. Lagg, Detroit, all of Mich. |
| --- | --- | --- |
| [21] | Appl. No. | 507,993 |
| [22] | Filed | Nov. 8, 1965 |
| [45] | Patented | Oct. 19, 1971 |
| [73] | Assignee | Raycon Corporation<br>Ann Arbor, Mich. |

[54] ELECTRODE-WEAR-COMPENSATING APPARATUS FOR AND METHOD OF ELECTRIC DISCHARGE MACHINING
9 Claims, 12 Drawing Figs.

[52] U.S. Cl..................................................... 219/69 V,
                                                               219/69 G
[51] Int. Cl......................................................... B23p 1/14
[50] Field of Search............................................ 219/69 C,
        69 E, 69 G, 69 S, 69 V, 127, 98, 234; 314/77

[56] References Cited
UNITED STATES PATENTS

| 1,963,915 | 6/1934 | Kennedy et al. | 314/77 X |
| --- | --- | --- | --- |
| 2,778,925 | 1/1957 | Gross et al. | 219/69 E |
| 2,818,491 | 12/1957 | Matulaitis | 219/69 G |
| 3,125,700 | 3/1964 | Bentley et al. | 219/69 G X |
| 3,247,599 | 4/1966 | O'Connor | 219/69 S X |

*Primary Examiner*—R. F. Staubly
*Attorney*—Olsen and Stephenson

ABSTRACT: Apparatus for and a method of electrical discharge machining of small holes in an electrically conducting workpiece is disclosed including specific electrode feeding structure and a unique trigger circuit. The electrode feeding structure is responsive to the trigger circuit for feeding a wire electrode operable in conjunction with the electrical discharge machining structure an amount after each operation of the machining structure determined by the erosion of the electrode in the previous operation of the machining structure.

The electrode feeding includes first electrode gripping means, means for moving the first electrode gripping means and the electrode gripped thereby toward a workpiece, second gripping means and means responsive to the trigger circuit on movement of the electrode into contact with the workpiece for releasing the electrode from the first gripping means, clamping the with the second gripping means, returning the first gripping means to the initial position thereof and subsequently releasing the electrode from the second gripping means and again gripping the electrode with the first gripping means.

The trigger circuit includes a first circuit operable to conduct only when the electrode is in a predetermined position with respect to the workpiece having control means therein for reversing the movement of the first gripping means when the electrode reaches the predetermined position with respect to the workpiece in movement toward the workpiece and a second circuit operable to conduct for a predetermined time after the first circuit conducts for switching the gripping means gripping the electrode on reverse movement of the first gripping means.

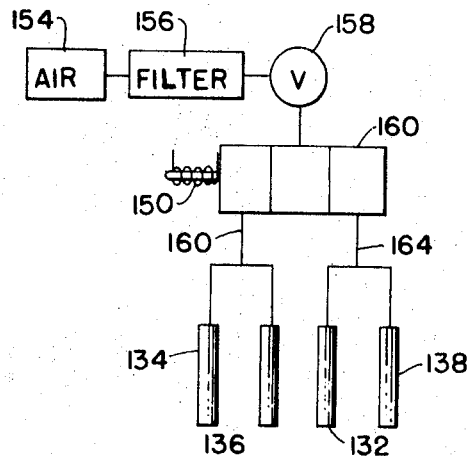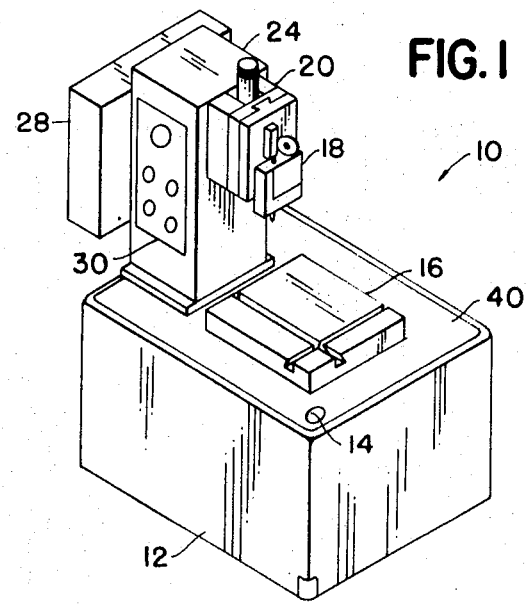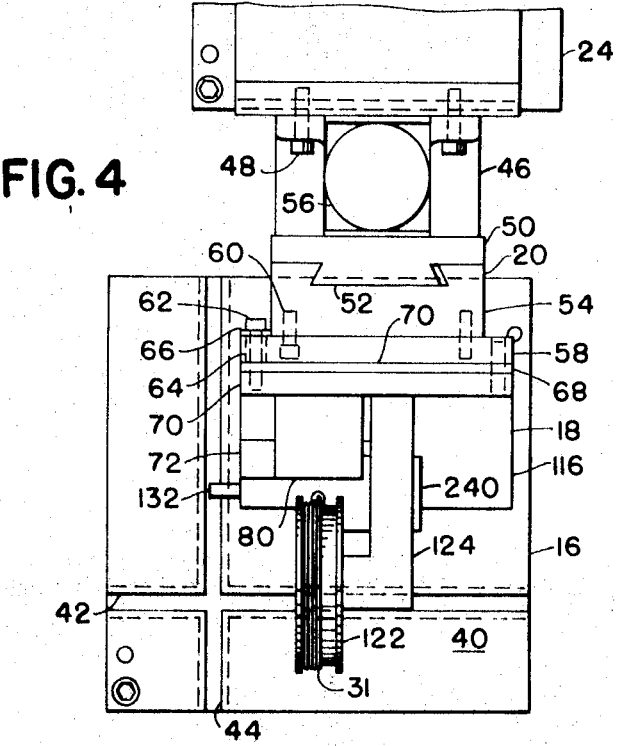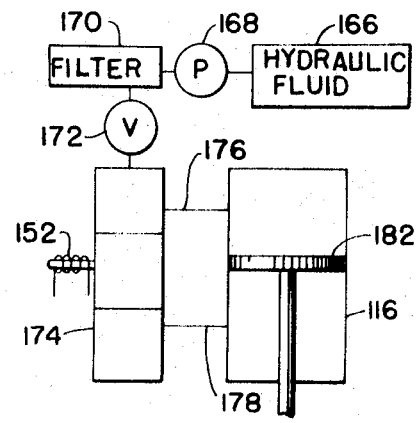

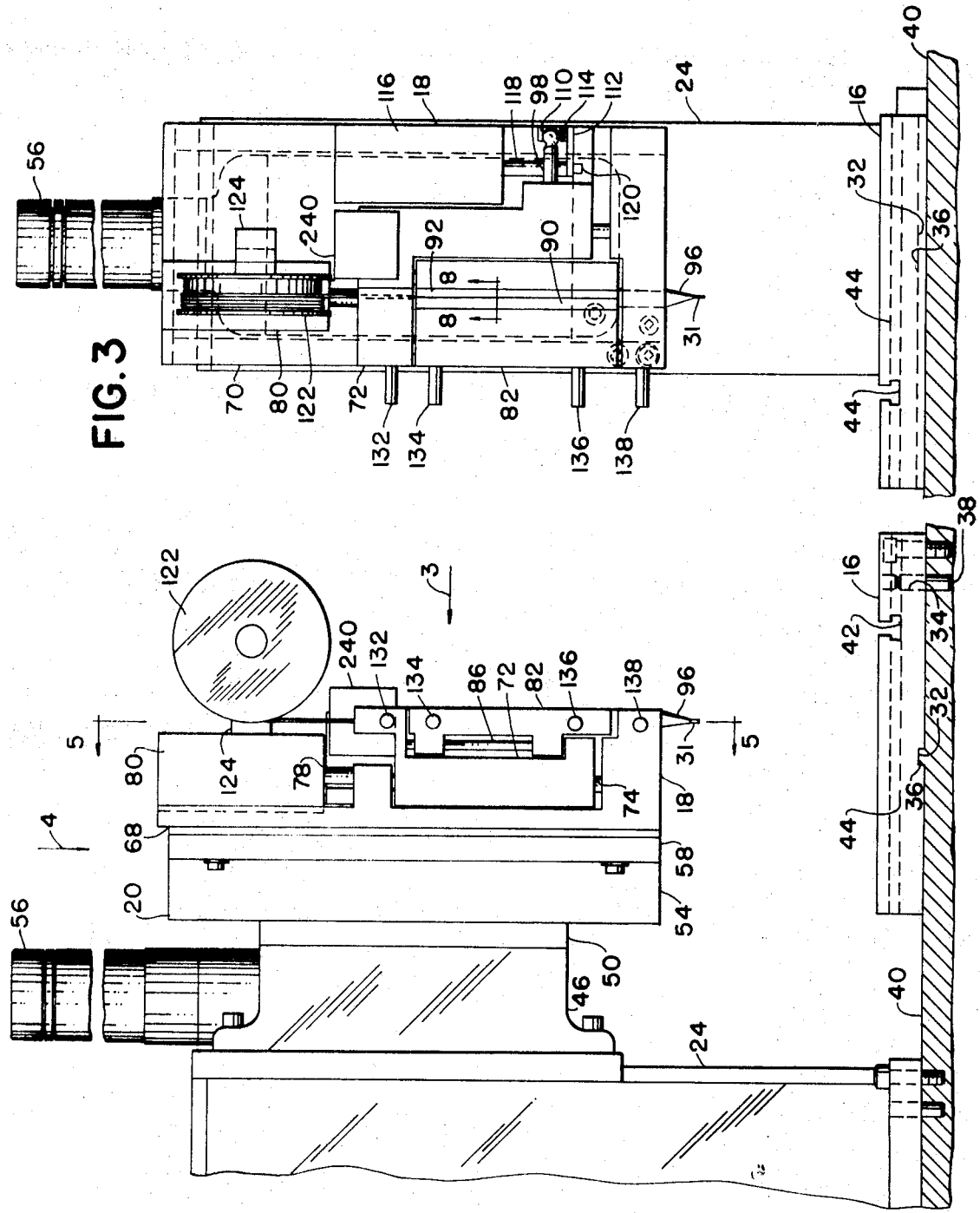

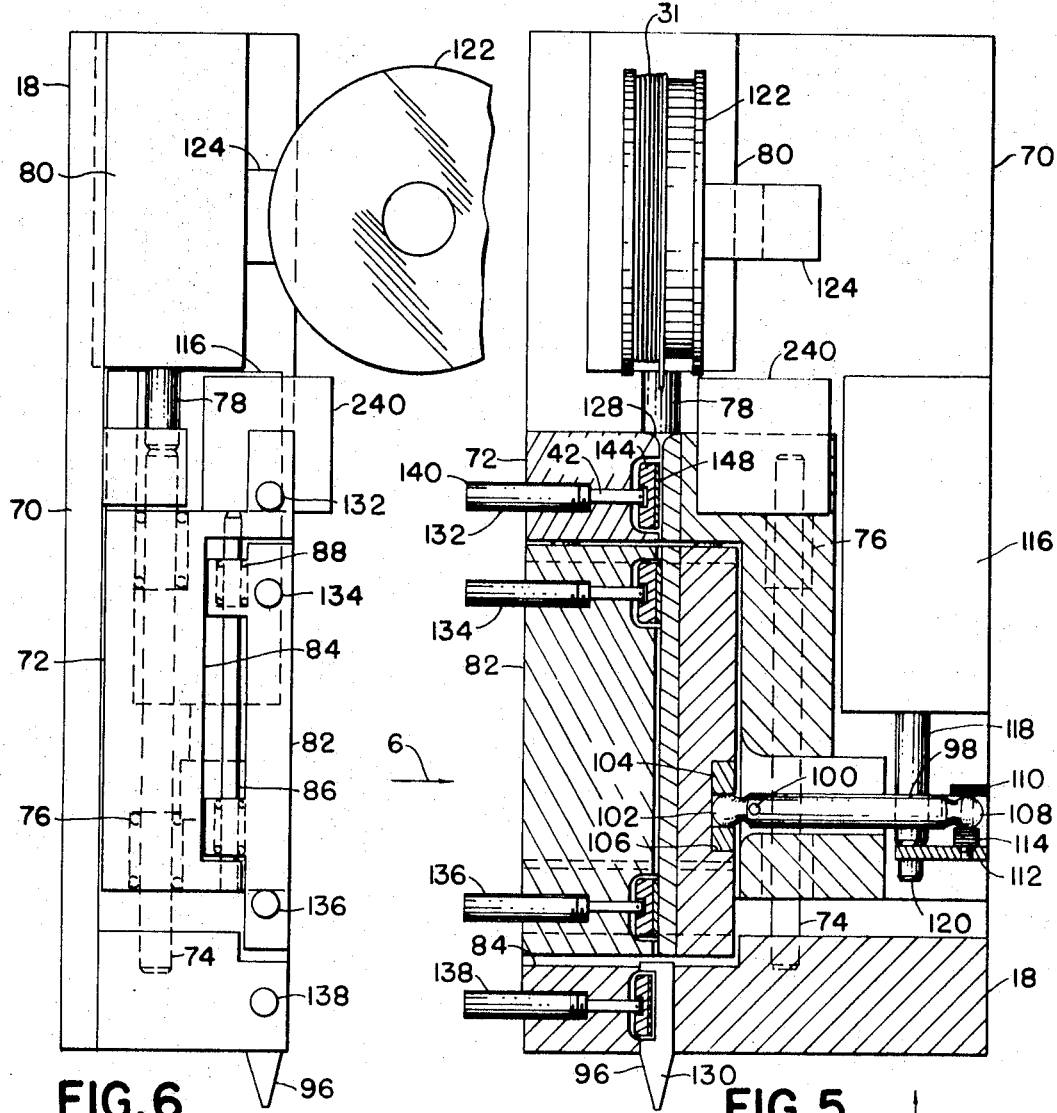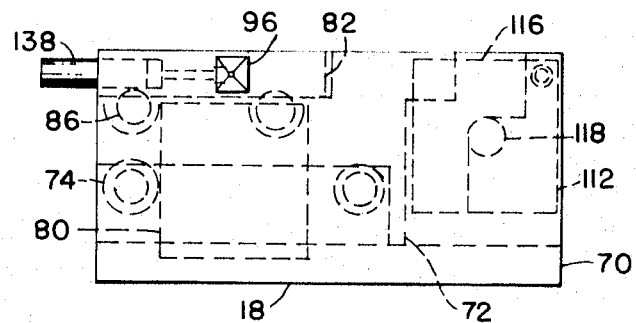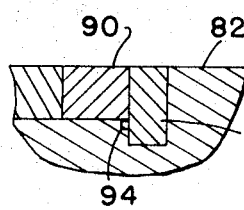

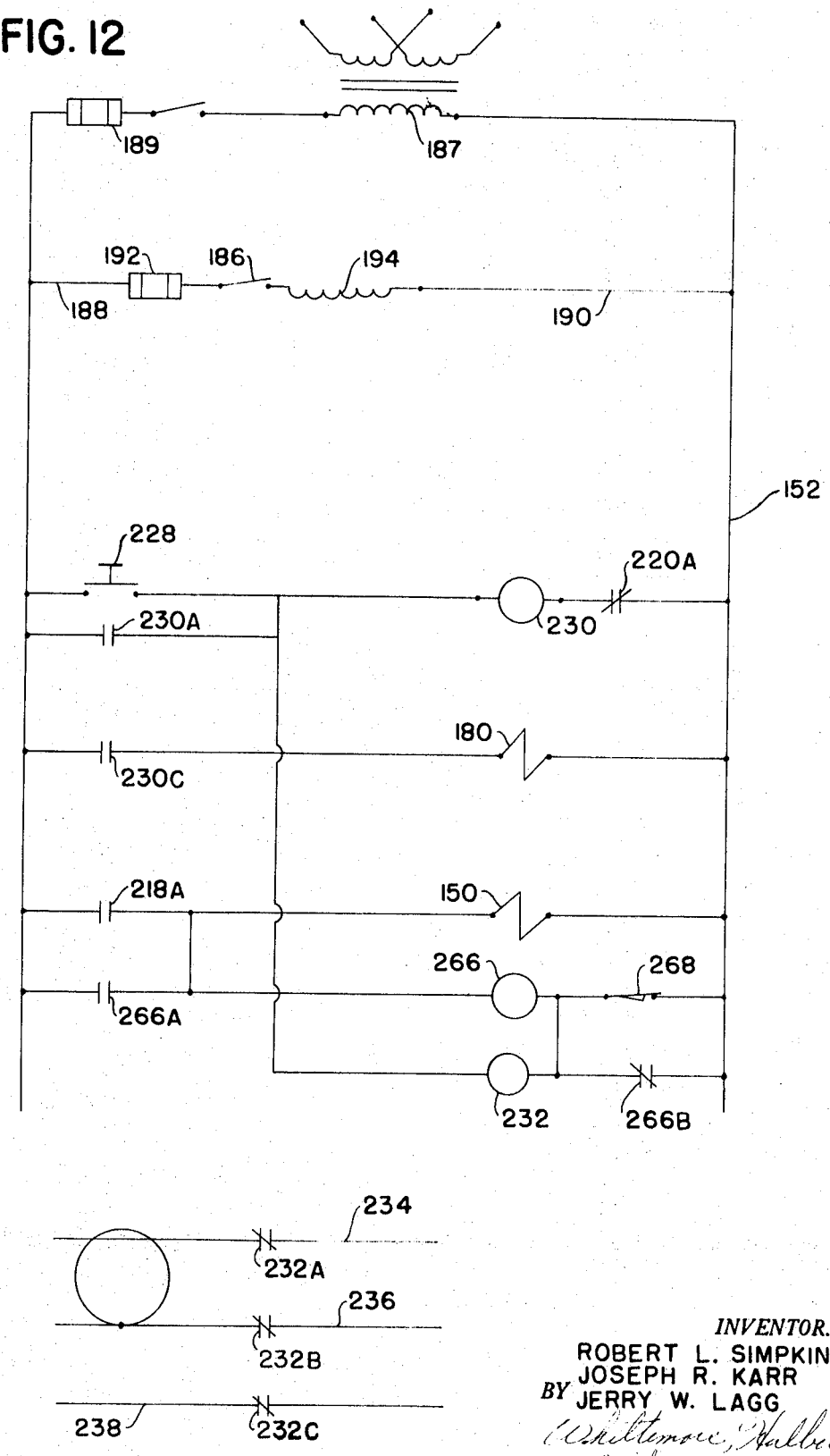

ELECTRODE-WEAR-COMPENSATING APPARATUS FOR AND METHOD OF ELECTRIC DISCHARGE MACHINING

The invention relates to electrical discharge machining and refers more specifically to an improved method of and structure for feeding an electrode in electrical discharge machining structure for cutting small holes.

Electrical discharge machining of small holes with wire electrodes or the like has been known in the past as shown in commonly owned U.S. Pat. application, Ser. No. 377,019, filed June 22, 1964, now Pat. No. 3,538,289, issued Nov. 3, 1970, the disclosure of which is incorporated herein by reference. However, with prior apparatus the electrode feeding structure has usually been complicated and has been capable of feeding only a predetermined quantity of electrode in each cycle of operation.

The feeding of a predetermined quantity of electrode in each cycle of operation is undesirable since there is no assurance that the electrode will wear the same amount in each cycle of operation. In practice cumulative errors of such electrode feed structure may cause considerable difficulty in a repetitive or automated machining operation.

It is therefore an object of the present invention to provide structure for machining small holes electrically as set forth above wherein the electrode feed structure includes means for electrically sensing the position of the electrode relative to a workpiece and the electrode feed in each cycle of operation is in accordance with the erosion of the electrode in the prior cycle of operation.

Another object is to provide improved structure for wire feeding or the like.

Another object is to provide structure for wire feeding including means for sensing when the wire fed is in a predetermined position electrically.

Another object is to provide an improved method of feeding an electrode in an electrical discharge machine or the like.

Another object is to provide a method of feeding an electrode including gripping an electrode with a shuttle, moving the shuttle in the direction of feed, securing the electrode to a carriage in the desired position thereof, releasing the electrode from the shuttle, returning the shuttle to the initial position thereof, regripping the electrode with the shuttle and releasing the electrode from the carriage.

Another object is to provide a method as set forth above and further including sensing the electrode when it is fed into the desired position thereof electrically to initiate the securing of the electrode to the carriage, releasing the electrode from the shuttle and returning the shuttle to its initial position.

Other objects and features of the invention will become apparent as the description proceeds, especially when taken in conjunction with the accompanying drawings, illustrating a preferred embodiment of the invention, wherein:

FIG. 1 is a perspective view of electrical discharge machining structure for machining small holes in electrically conducting workpieces including electrode feed structure constructed in accordance with the invention.

FIG. 2 is an enlarged partially broken away elevation view of the electrode feed structure illustrated in FIG. 1.

FIG. 3 is a front elevation view of the electrode feed structure illustrated in FIG. 2 taken in the direction of arrow 3 in FIG. 2.

FIG. 4 is a top view of the electrode feed structure illustrated in FIG. 2 taken in the direction of arrow 4 in FIG. 2.

FIG. 5 is an enlarged section view of the electrode feed structure illustrated in FIG. 2 taken substantially on the line 5—5 in FIG. 2.

FIG. 6 is a side elevation view of the electrode feed structure illustrated in FIG. 5 taken in the direction of arrow 6 in FIG. 5.

FIG. 7 is a bottom view of the electrode feed structure illustrated in FIG. 5 taken in the direction of arrow 7 in FIG. 4.

FIG. 8 is an enlarged partial section view of the electrode feed structure illustrated in FIGS. 1–7 taken substantially on the line 8—8 in FIG. 3.

FIG. 9 is a pneumatic diagram of the gripper actuating apparatus of the electrode feed structure illustrated in FIGS. 1–8.

FIG. 10 is a hydraulic diagram of the electrode feed structure illustrated in FIGS. 1–9.

FIG. 12 is a control circuit for use with the electrode feed structure illustrated in FIGS. 1–10.

Figure 11:
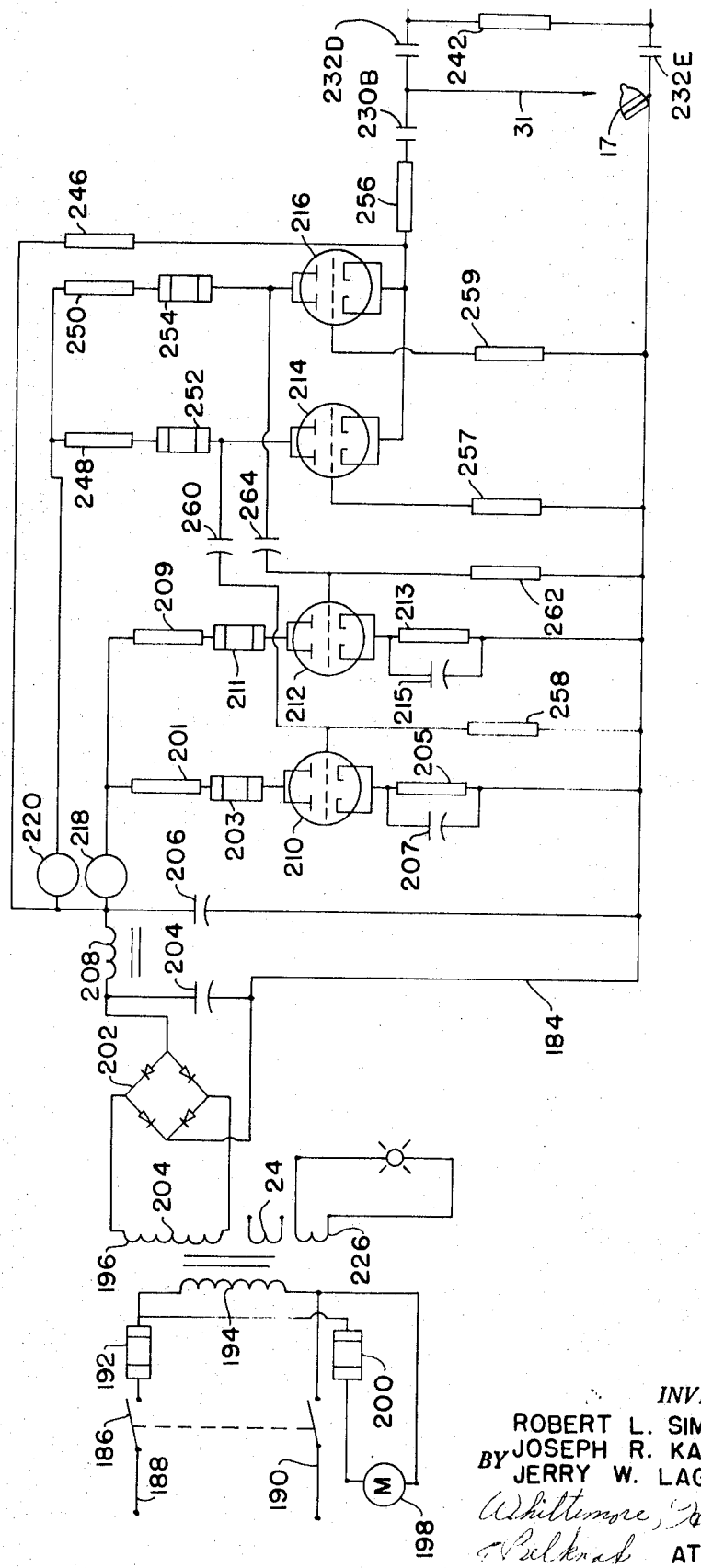
FIG. 11 is a schematic diagram of a trigger circuit for use with the electrode feed structure illustrated in FIGS. 1–10.

With particular reference to the figures of the drawings, one embodiment of the present invention will now be disclosed in detail.

As illustrated in FIG. 1, the electrical discharge machining structure 10 includes the base 12 having a dielectric storage tank (not shown) therein into which dielectric fluid may be drained through the opening 14. The work table 16 is positioned on base 12 to receive a workpiece such as a fuel injection nozzle 17 in which small holes are to be machined. Electrode feed structure 18 is secured to and insulated from the vertical slide structure 20 which is attached to column 24 secured to the base 12. The electrode feed structure 18 is controlled by the trigger circuit illustrated in FIG. 11 and the control circuit of FIG. 12 which may be included in the electrical box 28 supported on the column 24. An electrical discharge machining power supply 30 is positioned in the column 24.

The base 12, dielectric storage tank and associated dielectric fluid supply structure form no part of the present invention and will not therefore be considered in detail herein. It is only necessary that apparatus be provided to supply a dielectric fluid between the wire electrode 31 in the electrode feed structure and the workpiece 17 positioned on the work table 16.

Similarly the particular electrical discharge machining power supply 30 used with the electrical discharge machining structure 10 forms no part of the present invention and will not therefore be considered in detail herein. It is necessary however that in the usual manner for electrical discharge machining structures one electrode of the output of the electrical discharge machining power supply be connected to the electrode 31, as for example through the electrode feed structure 18 and the other electrode of the power supply 30 be connected to the workpiece 17 as through the work table 16.

As shown in more detail in FIGS. 2, 3 and 4 the work table 16 is a flat substantially square metal member having a locating groove 32 and locating dowel recess 34 which mate with the tongue 36 and dowel pin 38 integral with or provided in the top 40 of the base 12. Perpendicularly extending recesses 42 and 44 are provided in the upper surface of the work table 16 which have an inverted T-shaped cross section. The recesses 42 and 44 are provided to receive clamp means by which the workpiece 17 may be held in position beneath the electrode feed structure 18.

The slide structure 20 includes the supporting structure 46 secured to the column 24 by convenient means, such as bolts 48. The vertically extending member 50 secured to the supporting structure 46 is provided with a dovetail surface 52 shown in FIG. 4 mating with the slide 54 positioned thereon. The slide 54 is connected to the actuating cylinder 56 for movement therewith. Such slide structures are obtainable commercially and will not therefore be considered in further detail.

An adapter plate 58 is connected to the slide 54 by convenient means, such as the bolt 60. The base 70 of the electrode feed structure 18 is in turn connected to the adapter plate 58 by convenient means, such as bolt 62 which extends through the adapter plate 58 and is insulated therefrom by the bushing 64 and washer 66. The electrode feed structure 18 is insulated from the adapter plate 58 by the insulating member 68.

The electrode feed structure 18 is thus mounted for vertical movement on the slide structure 20 and is electrically insulated from the slide 54 and the rest of the electrical discharge machining structure 10. The slide structure 20 permits greater vertical movement of the electrode 31 than is permitted by the electrical discharge machine servomechanism including cylinder 80 secured to the electrode feed structure 18 to facilitate positioning and machining of different size workpieces secured to table 16.

The electrode feed structure 18 as more particularly shown in FIGS. 5, 6 and 7 includes a base 70 on which the electrohydraulic servo cylinder 80, the electrical discharge machine 10 and the hydraulic electrode feed cylinder 116 are mounted in a fixed location. The electrode guide, having an opening 130 therethrough for guiding an electrode toward a workpiece is secured to the base 70, as shown in FIG. 5.

A carriage 72 is mounted on the base 70 for vertical movement with respect thereto on the parallel rods 74 and ball bearing bushings secured to the base 70 and the carriage 72, respectively. The carriage 72 is connected to the piston rod 78 of the electrohydraulic servo cylinder 80 of the electrical discharge machine 10 for movement toward and away from a workpiece 17 on table 16 in accordance with the usual electrical discharge machine head movement circuitry (not shown) as, for example, set forth in U.S. Pat. No. 3,167,632 connected to the power supply 30.

A shuttle 82 is positioned in a recess 84 in the carriage 72 for vertical movement with respect thereto on the rods 86 positioned in the carriage and the ball bearing bushings 88 carried by the shuttle 82. A pair of overlapping inserts 90 and 92, as shown best in FIG. 8, are provided in the shuttle 82 to produce an opening 84 through which the wire electrode 31 is fed toward the electrode guide 96 carried by the base 70.

The shuttle 82 is positioned within the recess 84 by means of the lever 98 pivoted to the carriage 72 by pivot means 100. The lever 98 has the rounded end 102 positioned in the wear blocks 104 secured in the recess 106 in shuttle 82. The other end 108 of the lever 98 is also rounded and is bifurcated to receive the shouldered bolt 110 extending therethrough and into the bracket 112. The rounded end 108 of the lever 98 is in rigid engagement with the washers 114 and the head of the bolt 110. The hydraulic cylinder 116 is provided to pivot the lever 98 about the pivot mounting 100 and thus move the shuttle 82 vertically on the rods 86 in the recess 84. Cylinder 116 is engaged with the bracket 112 through the piston rod 118 and the bolt 120 extending through the bracket 112 and into the piston rod 118.

A reel 122 for holding the wire electrode 31 is supported from the base plate 70 by the bracket 124. The reel 122 is supported for rotation on the bracket 124 and is positioned to feed electrode wire 31 from the reel 122 through the opening 128 in the carriage 72, the opening 94 in the shuttle 82 and the opening 130 in the guide 96 carried by the base 70.

Pneumatically actuated grippers 132, 134, 136 and 138 are positioned in the carriage shuttle and base of the electrode feed structure 18, as shown best in FIGS. 5 and 6. The grippers 132, 134, 136 and 138 are the same. Therefore, only the gripper 132 will be considered in detail.

Gripper 132 includes a pneumatic cylinder 140, a piston rod 142 reciprocally held within the cylinder 140 and a pivotally mounted pressure member 144 which may have a plastic, electrode contacting wear surface 148 which pressure member is positioned on the end of the rod 142. The pneumatic grippers 132, 134, 136 and 138 are connected to a supply of air under pressure 154, so that when the solenoid 150 in the control circuit 152 of FIG. 12 is not energized the grippers 134 and 136 are actuated to grip an electrode extending through the opening 94 and the grippers 132 and 138 will not be actuated and will therefore be in the position shown in FIG. 5 to allow the electrode to pass through the openings 128 and 130. In contrast the grippers 132 and 138 are connected to the air supply to grip the electrode wire extending through passages 128 and 130 on energization of the solenoid 150 and the grippers 134 and 136 are held in their retracted position.

The pneumatic circuit for the electrode feed structure 18 may be as shown in FIG. 9 and includes a source of air under pressure 154, a filter 156 and a regulating valve 158 feeding a four-way valve 160 operated by the solenoid 150. The unactuated output line 162 of the four-way valve feeds the gripper structures 134 and 136, while the output line 164 of the four-way valve 160 feeds the gripper structures 132 and 138 when the four-way valve 160 is actuated by the solenoid 150.

Similarly the hydraulic circuit for the cylinder 116 as shown in FIG. 10 includes the hydraulic fluid supply 166, pump 168, filter 170 and flow control valve 172 feeding the four-way valve 174. The output connections 176 and 178 of the four-way valve 174 are connected to the cylinder 116. Thus on energization of the solenoid 152 in the control circuit 152 the four-way valve 174 is actuated to move the piston 182 up in FIG. 10, whereby the piston rod 118 will move up in FIG. 5. When the solenoid 152 is not energized the four-way valve 174 returns the piston 182 to a lower limiting position whereby the lever 98 and the shuttle 82 are returned to an upper limiting position.

The overall operation of the electrode feed structure 18 will be considered in conjunction with the trigger circuit 184 illustrated in FIG. 11 and the control circuit 152 illustrated in FIG. 12. At the start of a cycle of operation of the electric discharge machine 10 the piston rod 78 is retracted into servo cylinder 80 and the electrode feed structure 18 is as illustrated in FIG. 5. Thus the grippers 134 and 136 grip the wire electrode 31 in opening 94 and the grippers 132 and 138 do not engage the electrode in openings 128 and 130. The piston 118 is in a lower limiting position so that the shuttle 82 is in an up position. The switch 186 in FIG. 11 is closed so that alternating electrical energy at, for example 115 volts from a source of electric energy (not shown), is passed through transformer 187 and fuse 189 in FIG. 12, through conductors 188 and 190 and through fuse 192 to the primary winding 194 of transformer 196 in both FIGS. 11 and 12. The fan motor 198 which is connected in parallel with the primary winding 194 of the transformer 196 is energized through the fuse 200. Fan motor 198 is provided in conjunction with a fan (not shown) to cool the trigger circuit 184.

With the transformer 196 energized an alternating electrical signal will be provided at the input to the full wave bridge rectifier 202 from the secondary winding 204 of the transformer 196. The output of the bridge rectifier 202 which will be a direct current signal filtered through filter capacitors 204 and 206 and choke coil 208 will be present across the separate pairs of electron tubes 210 and 212 connected in parallel and 214 and 216 also connected in parallel through the relays 218 and 220 respectively.

Filament voltage is provided for the tubes 210, 212, 214 and 216 through the filament winding 224 on the transformer 196 while a green indicator light 226 is turned on to indicate that the transformer 196 is energized after switch 186 is placed in an on position. The trigger circuit 184 is thus in a standby condition with each of the relay contacts in the trigger circuit 184 and the control circuit 152 in their normal condition as shown.

The pushbutton 228 is then pressed whereby the relay 230 is energized through the normally closed contacts 220A associated with the relay 220. Simultaneously the relay 232 which may be positioned in the electrical discharge machine power supply 30 is energized to open the normally closed contacts 232A, 232B and 232C in the coaxial leads 234 and 236 to the electrode and workpiece from the power supply 30 and in the conductor 238 in the feed circuit for the vibrator 240 carried by the carriage 82 of electrode feed structure 18.

Energizing the relay 230 causes the holding contacts 230A to close, bypassing the pushbutton switch 228 and holding the relays 230 and 232 energized. Relay 230 also closes the normally open contacts 230B in the trigger circuit 184 while energizing the relay 232 also closes the normally open contacts 232D and 232E to connect the resistor 242 between the electrode wire 31 and a workpiece 17, as illustrated in the trigger circuit 184 in parallel with the now disconnected power supply 30.

Connecting the resistor 242 across the electrode 31 and workpiece 17 and closing the contacts 230B will place the output of the rectifier 202 across a voltage divider made up of the resistor 246, resistor 256 and resistor 242. A voltage is thus provided at the cathode of the tubes 214 and 216 to hold the tubes 214 and 216 at a cutoff potential.

Closing the relay 230 further closes the normally open contacts 230C to energize the hydraulic solenoid 152 whereby the four-way valve 174 in FIG. 10 is actuated to cause the piston 118 to move up in FIG. 5 and thus move the shuttle 82 down. The electrode wire which is clamped to the shuttle 82 by the grippers 134 and 136 is thus fed downwardly through the openings 128 and 130. When the electrode wire 31 engages or comes very close to engagement with the electrically conducting workpiece 17 the resistor 242 is shorted whereby the bias on the cathode of the tubes 214 and 216 in the trigger circuit 184 relative to the grids thereof which are connected through resistors 257 and 259 to the negative side of the output of rectifier 202 is altered to cause the tubes to conduct through the plate load resistors 248 and 250 and fuses 252 and 254 and cathode resistor 256.

Conduction of the tubes 214 and 216 will provide a pulse of energy through the relay 220 to open the contacts 220A whereby the relay 230 is deenergized along with the solenoid 152. The piston rod 118 is thus caused to reverse its upward movement and to move to downward limiting position.

Conduction of the tubes 214 and 216 also provides a pulse of energy on the grids of the electron tubes 210 and 212 for a short time determined by the time constant of the resistor 258 and capacitor 260 and resistor 262 and capacitor 264 connected as shown in FIG. 11. The tubes 210 and 212 will thus be caused to conduct through resistor 201, fuse 203 and resistor 205 in parallel with bias capacitor 207 and through resistor 209, fuse 211 and resistor 213 in parallel with bias capacitor 215, respectively, for a short time following the conducting of the tubes 214 and 216 whereby the relay 218 is energized to close the normally open contacts 218A. Closing the contacts 218A energizes the solenoid 150 whereby the grippers 132 and 138 are caused to grip the electrode wire and the grippers 134 and 136 are caused to release the electrode wire.

Simultaneously with the closing of the contacts 218A, the relay 266 is energized and is held energized by the relay contacts 266A along with the solenoid 150. When the shuttle 82 has returned to near the upper limiting position thereof, the limit switch 268 is caused to open deenergizing the relay 266 and reversing the grippers so that they return to the position indicated in FIG. 5 causing the electrode to be withdrawn a very short distance from the workpiece. In a subsequent cycle of operation the limit switch 268 is again closed on initial downward movement of the shuttle 82.

When the relay 230 was deenergized the relay 232 was similarly deenergized. Thus the contacts 232A, 232B and 232C are closed whereby the power supply 30 and vibrator 240 are connected for operation and the usual machining operation of a cycle of the electrical discharge machine structure 10 may be accomplished with the carriage being moved by piston rod 78 under control of the usual servo system.

Thus, it will be seen that there is provided in accordance with the invention electrical discharge machining structure for machining small holes in electrically conductive workpieces including electrode feeding structure 18 in which the electrode is fed during each cycle of operation of the electrical discharge machine a distance sufficient to permit starting of the electrical discharge machining operation in each cycle with an electrode which is initially a predetermined distance from the workpiece. The electrode is thus fed in each cycle an amount determined by the erosion thereof in the previous cycle.

It will of course be obvious that the operation of the electrical discharge machining structure 10 and the electrode feeding structure 18 as well as feeding, positioning and indexing of workpieces 17 as on a tilt-table and rotatable fixture secured to table 16 may be accomplished automatically and sequentially if desired.

While one embodiment of the present invention has been disclosed in detail, it will be understood that other embodiments and modifications thereof are contemplated. Thus, for example, it would be possible to also use the electrical discharge machine servosystem hydraulic cylinder 80 for feeding the electrode by connecting the hydraulic lines 176 and 178 thereto and providing switching structure to alternatively provide flow to the cylinder 80 from the usual hydraulic lines to the cylinder 80 and from the hydraulic lines 176 and 178. It would also be possible to use the usual electrical discharge machine gap sensing apparatus for sensing the position of the electrode in engagement with the workpiece in place of the trigger circuit 184 if desired. It is the intention to include all embodiments and modifications as are defined by the appended claims within the scope of the invention.

What we claim as our invention is:

1. In electrical discharge machining structure for cutting small holes in an electrically conducting workpiece, means for feeding an electrode an amount after each operation of the electrical discharge machining structure determined by the erosion of the electrode in the previous operation of the electrical discharge machining structure including apparatus for sensing electrical contact between the workpiece and electrode to determine the amount of electrode fed after each operation of the electrical discharge machining structure and further including a base, a servomotor secured to the base, a carriage mounted on said base for reciprocal movement with respect thereto in accordance with actuation of the servomotor, a shuttle carried by the carriage, a hydraulic cylinder secured to the base for reciprocating the shuttle relative to the carriage, a guide carried by said base, an opening extending through said carriage, shuttle and guide adapted to receive an electrode for feeding, a plurality of grippers, at least one of which is carried by the carriage and base for alternatively gripping an electrode in the opening, means for initially gripping the electrode with the gripper carried by the shuttle and moving the shuttle to feed the electrode through the opening in the carriage and guide toward a workpiece, means for sensing engagement of the electrode with a workpiece, means for gripping the electrode with the gripper on the carriage and base for releasing the electrode from the gripper carried by the shuttle and for returning the shuttle to its initial position in response to sensing engagement of the electrode and workpiece and means responsive to the return of the shuttle to its initial position for initiating gripping the electrode with the gripper carried by the shuttle and release of the electrode from the gripper carried by the base and the carriage whereby the carriage may be moved in a normal electric discharge machining operation by the servomotor to feed the electrode through the guide and carriage.

2. Structure as set forth in Claim 1 wherein the means for sensing the engagement of the electrode with the workpiece comprises a trigger circuit including a source of direct current electrical energy, a first parallel circuit connected across the source of electrical energy including a voltage divider and the electrode and workpiece in series, a second parallel circuit including a relay and electronic switch means connected across a portion of said voltage divider, biased to conduct current on engagement of said electrode and workpiece to actuate said relay and a third parallel circuit including a second relay and second electronic switch means in series connected across the source of electric energy, said second electronic switch means including a time constant bias circuit connected to the first electronic switch means to provide a bias pulse to cause the second switch means to conduct through said second relay in response to conducting of the first switch means.

3. Structure as set forth in Claim 2 whereby the means responsive to the return of the shuttle to its initial position includes a limit switch engageable with said shuttle just prior to the arrival of the shuttle at the initial position thereof.

4. Electrode feeding structure comprising a base, a carriage mounted on said base for reciprocal movement with respect thereto, a shuttle carried by the carriage, a hydraulic cylinder secured to the base for reciprocating the shuttle relative to the carriage, a guide carried by said base, an opening extending through said carriage, shuttle and guide adapted to receive an electrode for feeding, a plurality of grippers, at least one of which is carried by the shuttle and one of which is carried by the carriage and base for alternatively gripping an electrode in the opening, means for initially gripping the electrode with the gripper carried by the shuttle and moving the shuttle down to feed the electrode through the opening in the carriage and guide toward a workpiece, means for sensing engagement of the electrode with a workpiece, means for gripping the electrode with the gripper on the carriage and base, for releasing the electrode from the gripper carried by the shuttle and for returning the shuttle to its initial position in response to sensing engagement of the electrode and means responsive to the return of the shuttle to its initial position for initiating gripping the electrode with the gripper carried by the shuttle and release of the electrode from the gripper carried by the base and carriage.

5. Structure as set forth in claim 4 wherein the means for sensing the engagement of the electrode with the workpiece comprises a trigger circuit including a source of direct current electrical energy, a first parallel circuit connected across the source of electrical energy including a voltage divider and the electrode and workpiece in series, a second parallel circuit including a relay and electronic switch means connected across a portion of said voltage divider, biased to conduct current on engagement of said electrode and workpiece to actuate said relay and a third parallel circuit including a second relay and second electronic switch means in series connected across the source of electric energy, said second electronic switch means including a time constant bias circuit connected to the first electronic switch means to provide bias pulse to cuse the second switch means to conduct through said second relay in response to conducting of the first switch means.

6. Structure as set forth in claim 5 wherein the means responsive to the return of the shuttle to its initial position includes a limit switch engageable with said shuttle just prior to the arrival of the shuttle at their initial position thereof.

7. In electrical discharge machining structure for cutting small holes in an electrically conducting workpiece, and electrode and means for automatically feeding the electrode and amount after each operation of the electrical discharge machining structure determined by the erosion of the electrode in the previous operation of the electrical discharge machining structure comprising relatively movable gripping means for gripping the electrode at one point and moving the electrode in a desired direction, relatively stationary gripping means operably associated with the electrode at at least one other point for gripping the electrode at the other point and circuit means operably associated with the relatively movable and relatively stationary gripping means including means for gripping the electrode with the relatively movable gripping means, means for moving the electrode in the desired direction, means for gripping the electrode with the relatively stationary gripping means, means for releasing the electrode from the relatively movable gripping means, means for returning the relatively movable gripping means to their initial position, means for regripping the electrode with the relatively movable gripping means, and means operably associated with the circuit means for sensing engagement of the electrode with an electrically conducting workpiece and reversing the direction of movement of the relatively movable gripping means in the desired direction in response to sensing of the engagement of the electrode and the workpiece.

8. In electrical discharge machining structure for cutting smallholes in an electrically conducting workpiece, an electrode and means for automatically feeding the electrode an amount after each operation of the electrical discharge machining structure determined by the erosion of the electrode in the previous operation of the electrical discharge machining structure comprising relatively movable gripping means for gripping the electrode at one point and moving the electrode in a desired direction, relatively stationary gripping means operably associated with the electrode at at least one other point for gripping the electrode at the other point and circuit means operably associated with the relatively movable and relatively stationary gripping means including means for gripping the electrode with the relatively movable gripping means, means for moving the electrode in the desired direction, means for gripping the electrode with the relatively stationary gripping means, means for releasing the electrode from the relatively movable gripping means, means for returning the relatively movable gripping means to their initial position, means for regripping the electrode with the relatively movable gripping means, and further including means operably associated with the relatively movable gripping means for regripping the electrode with the relatively movable gripping means and releasing the electrode from the relatively stationary gripping means prior to the arrival of the relatively movable gripping means at the initial position thereof.

9. In electrical discharge machining structure, an electrode, means supporting said electrode, means for moving said supporting means with said electrode thereon during machining operation of said structure, means for feeding said electrode relative to said supporting means an amount after each said machining operation corresponding to the amount of said electrode eroded during said operation including means for sensing electrical contact between the workpiece and the electrode, and means responsive to sensing of said electrical contact operable to withdraw said electrode a predetermined distance from the workpiece.

PO-1050
(5/69)

UNITED STATES PATENT OFFICE
CERTIFICATE OF CORRECTION

Patent No. 3,614,371            Dated October 19, 1971

Inventor(s)   Robert L. Simpkins et al

It is certified that error appears in the above-identified patent and that said Letters Patent are hereby corrected as shown below:

In the Abstract - first line (second paragraph) "structure" should be inserted after "feeding".

Col. 1, lines 30 and 31 and 35 and 36 were cancelled in an amendment mailed to the Patent Office and dated June 23, 1969.

line 72, "Fig. 4" should be -- Fig. 5 --.

Col. 2, line 4, after "feed" insert -- cylinder actuating apparatus of the electrode feed --.

Col. 3, line 29, "84" should be -- 94 --.

Col. 6, line 49, "electric" should be -- electrical --.

Col. 7, line 33, before "provide" insert -- a --; same line, "cuse" should be -- cause --;

Line 42, "and" should be -- an --;

line 43, "and" (second occurrence) should be -- an --.

Signed and sealed this 18th day of July 1972.

(SEAL)
Attest:

EDWARD M. FLETCHER, JR.          ROBERT GOTTSCHALK
Attesting Officer                Commissioner of Patents